AUTOMATIC NUMBER INTERCEPT IDENTIFICATION SYSTEM

Filed Dec. 17, 1965 Sheet 1 of 2

INVENTORS B.E. MC CAFFREY
H.R. MOORE
D.H. PENNOYER

Howard R Popper
ATTORNEY

Feb. 4, 1969 B. E. McCAFFREY ET AL 3,426,156

AUTOMATIC NUMBER INTERCEPT IDENTIFICATION SYSTEM

Filed Dec. 17, 1965 Sheet 2 of 2

United States Patent Office 3,426,156
Patented Feb. 4, 1969

3,426,156

AUTOMATIC NUMBER INTERCEPT IDENTIFICATION SYSTEM

Bernard E. McCaffrey, Atlantic Highlands, Harold R. Moore, Middletown, and Douglas H. Pennoyer, Colts Neck, N.J., assignors to Bell Telephone Laboratories, Incorporated, New York, N.Y., a corporation of New York Filed Dec. 17, 1965, Ser. No. 514,610
U.S. Cl. 179—18 6 Claims
Int. Cl. H04m 3/00, 3/60

This invention relates to automatic telephone switching systems and more particularly to an arrangement for improving call intercept service in such systems.

The mechanization of telephone intercept service has become an increasingly important objective because intercept service tends to remain a high cost service whereas other telephone services have been amenable to the utilization of improved circuit techniques. The continued need to budget intercept operator time for asking the calling party the telephone number dialed is an important item of this cost.

While it has heretofore been proposed to use on intercept calls the automatic number identification networks which are used on originating calls, see for example, A. E. Joel, Jr., Patent 3,143,601, Aug. 4 1964, certain cabling problems are inherent in the use of this system. In the Joel patent apparatus, the final terminals of an intercepted line must be specially cross-connected to an intercept trunk. Each intercept trunk also requires an "ITR" relay for each line to be intercepted. Thus, both the cost of a relay per intercepted line, as well as the cost and inconvenience of cross-connecting between the distributing frame terminals assigned to the line and the intercept trunk, have prevented the apparatus of the aforementioned patent from being widely employed in the telephone industry.

Prior to the advent of the Joel patent apparatus above referred to, calls placed to lines that were unavailable for use were intercepted by connecting the line terminals to a common intercept trunk which had a plurality of appearances on the distributing frame. A three-conductor strap which often took the form of a spring clip "shoe" was applied to the intermediate distributing frame terminals of the line to be intercepted and the intermediate distributing frame multiple terminals of the operator intercept trunk. The use of this temporary spring clip "shoe" involved no expensive cross-connecting between the terminals of the intercepted line and the intercept trunk inasmuch as the terminals of the intercept trunk were multipled adjacently to the line terminals on the same (intermediate) distributing frame. As was indicated in the Joel patent, however, the need to use operator intercept trunks wherein the operator was required to request the number dialed by the calling party was itself an unsatisfactory situation to which the Joel patent afforded a certain degree of relief.

Accordingly, it is an object of the present invention to provide a means whereby the automatic number identification features disclosed in the above-mentioned Joel patent may be economically implemented in existing telephone switching offices without requiring cumbersome wiring changes.

In accordance with the principles of the present invention, in one illustrative embodiment thereof, an intercept connector "shoe" may be used between the intermediate distributing frame terminals of an intercepted line and the terminals of the intercept trunk multiple. The particular shoe to be employed contains a diode singal-directing device. When the switching train of the telephone office makes connection to the terminals of a called line, busy test potential is applied to its sleeve terminal in the normal manner. If the particular line being called is one whose distributing frame terminals have the intercept connector shoe attached, the intercept trunk is seized and the line's signal-directing diode becomes conductive. The intercept trunk applies a short interval of A.C. identifying signal to its sleeve lead and this signal is continued through the conducting diode to the sleeve terminal of the intercepted line at the distributing frame. The number network connected to the line sleeve terminal at the distributing frame is thereupon operated to identify the directory number of the called line.

It is an aspect of the present invention that the signal-directing diodes are advantageously of the Zener type, all of which are poled in the same direction with regard to the intercept trunk. Should a call be directed to an intercepted line while another call is using the same intercept trunk, the line busy potential applied to the trunk by the line using the trunk is coupled through the Zener diode of the second called line to prevent the latter's switching train from maintaining a second connection to the intercept trunk.

It is a further aspect of the present invention that the Zener diode of a called intercepted line provides a bi-directional path for the A.C. identifying tone appearing on the intercept trunk sleeve conductor whereas the Zener diodes belonging to the non-called intercepted lines prevent the passage of substantially any A.C. current through their associated identifying networks.

Accordingly, it is a feature of the present invention to employ a common intercept trunk to which a plurality of intercepted lines are connected by signal-directing diodes.

It is another feature of the present invention to steer any identifying tone from the intercept trunk to a called intercepted line by causing the switching train to break down only the diode belonging to the called line.

The foregoing and other objects and features may become more apparent by referring now to the detailed description and drawing, in which:

FIG. 1 shows a telephone central office employing the automatic number identification arrangement of the present invention, and in which;

Figure 1:
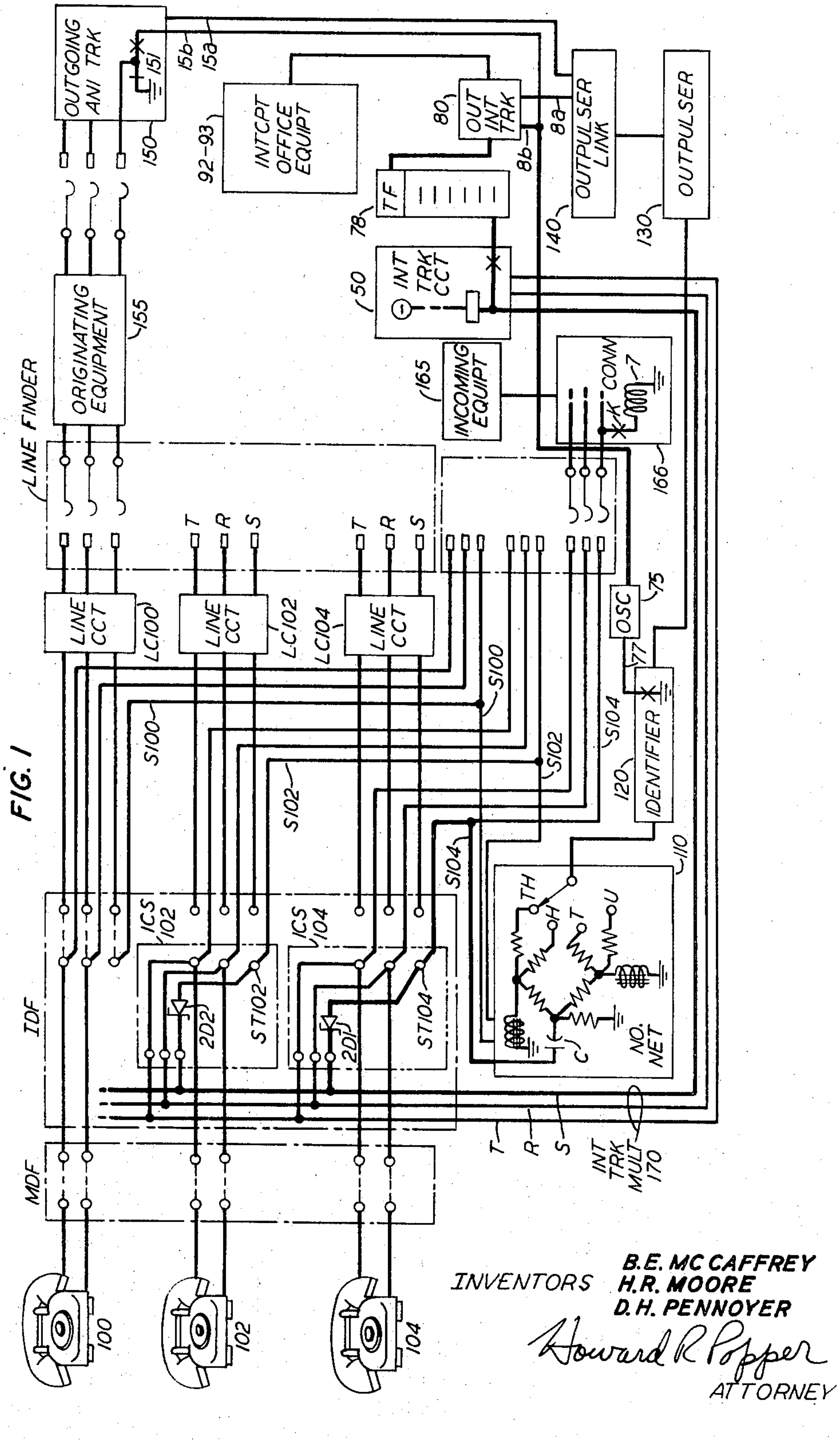

A plurality of telephones 100, 102, 104 are shown at the left-hand side of FIG. 1 connected to main distributing frame MDF. The main distributing frame MDF provides cross-connections, indicated by dash lines between the terminal points, by means of which a particular directory number may be assigned to any telephone station. The right-hand terminals of the main distributing frame are connected to the left-hand terminals of the intermediate distributing frame IDF. The intermediate distributing frame provides cross-connections for assigning a line circuit to a particular directory number and to a connector bank multiple appearance associated with that directory number. The left-hand terminals of the intermediate distributing frame IDF are wired to the banks of the connector switches and the sleeve terminal of each set of terminals is connected to number network 110 for automatic number identification.

According to the conventional use of number networks, as disclosed, for example, in Cahill patent 3,071,650, the directory number of a telephone originating a call is obtained by a CAMA office (not shown) returning a request signal through outgoing ANI trunk 150. This signal is received by trunk 150 and trunk 150, by means of cable 15a, causes outpulser link 140 to assign an outpulser 130 to the trunk. Outpulser 130 seizes identifier 120. The identifier grounds lead 77 to oscillator 75 which is connected to outgoing ANI trunk 150 by lead **15*b*. Incident to the request from the CAMA office, outgoing ANI trunk 150 operates transfer contacts 151 (windings not shown) and transfers the sleeve lead holding path for holding the switching train of originating equipment 155 to lead 15*b*. Oscillator 75 superimposes a 2.2 volt, 5800 cycle identifying signal on the sleeve holding path. This alternating current signal is extended back over the sleeve conductor of originating equipment switching train 155 through the line circuit of the calling line to the intermediate distributing frame IDF. Assuming telephone 100 to be a calling telephone, the A.C. signal would appear at sleeve lead S100 at the intermediate distributing frame. Sleeve lead S100 is connected to number network 110 which couples the A.C. signal to the particular TH, H, T, and U buses indicating the directory number assigned to station 100. The appearance of the A.C. signal on these buses results in identifier 120 furnishing outpulser 130 the directory number information concerning station 100**.

It is thus seen that in the normal operation of the automatic number identification apparatus, it is the switching train 155 which provides a unique path for the A.C. signal from lead **15*b*** to the terminal of the number network.

In accordance with the principles of the present invention, it is desired to use for intercept identification the same number network 110 as is used in obtaining directory number information for originating calls. However, the number network will now be used to obtain the directory number assigned to intermediate distributing frame terminals to which calls are placed, rather than to those terminals which are being used to originate calls. Accordingly, the operation of the incoming switching equipment 165 will now be described. On a call to a telephone station, 100 for example, the incoming switching equipment 165 operates in the normal manner to select and operate connector 166 to the connector bank multiplies corresponding to the terminals of telephone 100. Since telephone 100 is assumed to be a normally operating telephone, cross-connections are present both at the main and at the intermediate distributing frames MDF and IDF, respectively. Connector 166 makes a busy test of the sleeve terminal, and assuming telephone 100 to be idle, operates contact K and applies ground to the sleeve terminal to hold switching train incoming equipment 165.

Let it be assumed that stations 102 and 104 are unavailable for service because their directory numbers are awaiting reassignment. If a call is nevertheless made to these directory numbers, it is necessary to apprise the calling party that he has reached a telephone whose directory number has been changed. In accordance with the principles of the present invention, intercept connector shoes ICS102 and ICS104 are inserted between the left-hand intermediate distributing frame terminals associated with lines 102 and 104 and one of the multiple terminals of common intercept trunk 170.

Inasmuch as telephones 102 and 104 are unavailable for service, the cross-connections which would otherwise be present between their left and right-hand terminals, on main distributing frame MDF and intermediate distributing frame IDF, are removed. Accordingly, line circuits LC102 and LC104 may be cross-connected to other directory number terminals of intermediate distributing frame IDF. In order to apprise the calling party who has called the directory number formerly assigned to station 104 that the person he desires to reach has been assigned a new number without it being required to ask the calling party what number he dialed, it is necessary automatically to obtain the directory number of the terminals actually reached by connector 166 and to transmit this information to the intercept office 92–93. The directory number of a called line placed on intercept is obtained as follows. When contacts K of connector 166 are operated incident to the busy test of the called line, ground is applied to sleeve S104. Intercept connector shoe ICS104 contains a Zener diode 2D1 which connects the sleeve terminal of the intermediate distributing frame appearance of line 104 to one of the sleeve lead terminals of intercept trunk multiple 170. Intercept trunk multiple 170 offers to the distributing frame IDF multiple appearances of the tip and ring and sleeve conductors of intercept trunk circuit 50. Intercept trunk circuit 50 advantageously may comprise a simplified version of the trunk 50 as described in A. E. Joel, Jr. patent 3,143,601 mentioned above and need not contain the ITR-relays therein desscribed. Intercept trunk circuit 50 is seized by the extension of a call to the connector bank terminals of any of stations 102 or 104 connected to intercept trunk multiple 170.

When seized, trunk circuit 50 applies battery to the sleeve conductor of trunk multiple 170 and calls trunk finder 78 into operation. The battery applied in intercept circuit 50 to the sleeve of intercept trunk multiple 170 renders Zener diode 2D1 conductive. This path may be traced from ground, coil 7, and make contact K in connector 166 to sleeve S104 of the connector bank multiple, the sleeve terminal assigned to line 104 in distributing frame IDF, Zener diode 2D1 of intercept connector shoe ICS104, the sleeve of intercept trunk multiple 170, to battery in intercept trunk circuit 50. Although battery is applied to one end of each of the Zener diodes 2D1, 2D2, etc., connected to the intercept trunk multiple, only the one thereof which has ground applied to its other end by connector 166 will be so rendered conductive.

Trunk finder 78, called into operation by the seizure of intercept trunk circuit 50, is associated with outgoing intercept trunk 80 which, in turn, provides a path to intercept office 92–93 which advantageously may serve a number of different telephone offices. When a connection is established to outgoing intercept trunk 80, outpulser link 140 is seized by this trunk over lead **8*a* in the same manner that link 140 was seized by outgoing ANI trunk 150. Outpulser link 140, in turn, seizes outpulser 130, which seizes identifier 120. The latter activates oscillator 75 which applies the alternating current identification signal to outgoing intercept trunk 80 over lead 8*b*. Choke coil 7 in connector 166** prevents the A.C. tone from inadvertently being short-circuited by the switch train holding ground.

Through the operation of trunk finder 78 a continuous sleeve lead path for the A.C. signal is provided from outgoing intercept trunk 80 to intercept trunk circuit 50 and intercept trunk multiple 170. Since only one of Zener diodes 2D1, 2D2 has been rendered conductive by ground in connector 166 and battery in intercept trunk circuit 50, the A.C. signal is provided with a unique path to be distributing frame terminal of the number network belonging to the line selected by connector 166.

The number network 110 decodes the A.C. signal to provide identifier 120 with the directory number of the terminals to which connector 166 has established a connection. Identifier 120 forwards this information to outpulser 130 and the later outpulses the directory number of the called line to the intercept office through outpulser link 140 and outgoing intercept trunk 80.

While for the sake of simplicity only one incoming switching train connector 166 has been shown in FIG. 1, it will be appreciated that a plurality thereof are provided in telephone central offices. On occasion it may happen that after the illustrated connector has made connection to the terminals of line 104, and while intercept trunk circuit 50 is thus in use, another connector (not shown) associated with incoming equipment 165 may attempt to seize the same intercept trunk. This might occur, for example, if a call were attempted to be made to intercepted line 102 while trunk circuit 50 were already in use on a call to intercepted line 104. It will be recalled that when connector 166 sought out the connector bank terminals of line 104, it made a busy test. Circuitry (not shown) in connector 166 responded in the conventional manner to the presence of battery potential on sleeve lead S104 to permit connector 166 to operate contact K and thereby apply switch train holding ground in series with choke coil 7 to incoming equipment 165. This switch train holding ground is conveyed by Zener diode 2D1 to the sleeve lead S of intercept trunk multiple 170. Accordingly, when the above-mentioned "other" connector attempts to seize the terminals of line 102, ground rather than intercept trunk 50 battery will be applied to the sleeve lead of intercept trunk multiple 170. Zener diode 2D2 will be rendered conductive by the combination of ground on the sleeve lead of intercept trunk multiple 170 and the busy test potential applied by this "other" connector, thereby to couple the ground as a busy indication to this connector and prevent its seizing line 102.

In one illustrative embodiment of the invention, the A.C. tone applied by oscillator 75 has an r.m.s. value of 2.2 volts and Zener diodes 2D1, 2D2, etc., were type No. 446T manufactured by the Western Electric Company. The particular diode employed has a Zener breakdown voltage of approximately 8 volts. This value was chosen so that the Zener diodes belonging to the idle intercepted lines would withstand (without breaking down) the peak inverse voltage developed during the application of the A.C. tone to the trunk. The value of this voltage ($2\times 2.2\sqrt{2}$ volts) across each nonselected line's Zener diode is obtained by adding the peak value of the A.C. tone signal applied by oscillator 75 to the value of the charge voltage developed only during the first half-cycle of tone on each nonselected line's "C" capacitor in number network 110.

Figure 2:
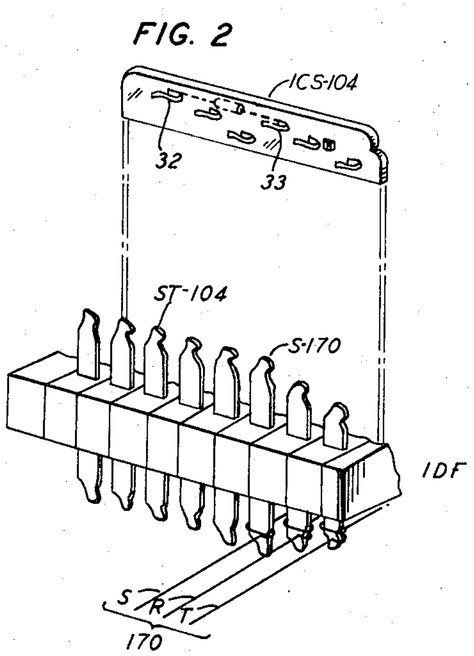
FIGS. 2 and 3 show two views of an intercept connector shoe for use with the invention.
Figure 3:
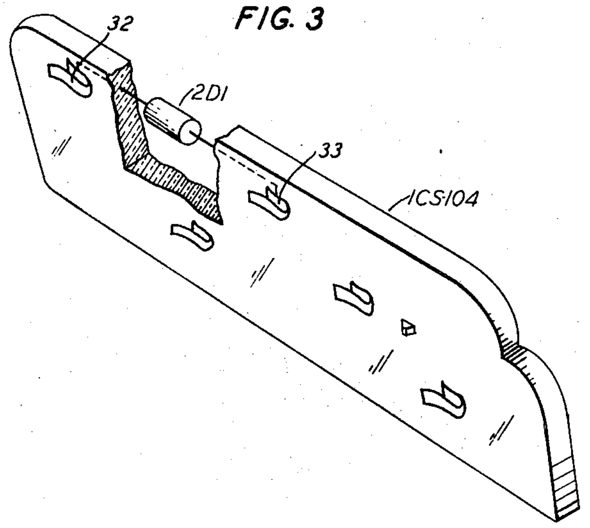

The physical structure of an illustrative embodiment of intercept connector shoe ICS104 in relationship to the terminals of the intermediate distributing frame IDF is shown in FIG. 2. For the sake of clarity, only one row of terminals of the distributing frame is depicted and the intercept connector shoe is shown lifted away from these terminals so as not to confuse the details of the shoe with those of the distributing frame itself. The tip, ring, and sleeve conductors of intercept trunk multiple 170 are wired in multiple to the underside of the three rightmost terminals of each row of terminals of the distributing frame IDF. When the body of intercept connector shoe ICS104 is pushed down behind the illustrated row of terminals, spring clip 32 engages terminal ST104 belonging to intercepted line 104 and spring clip 33 engages terminal S170 of intercept trunk multiple 170. FIG. 3 shows in an enlarged cut-away view the manner in which Zener diode 2D1 may conveniently be encapsulated within the plastic insulating body of the intercept connector shoe.

Although the present invention has been illustrated in a telephone office of the well-known step-by-step type, it should be appreciated that the same principles are applicable to other switching systems and in particular to the equally well-known panel dial switching system. It is to be understood that the above-described arrangements are illustrative of the application of the principles of the invention; numerous other arangements may be devised by those skilled in the art without departing from the spirit and scope of the invention.

What is claimed is:

1. In a telephone switching system
a plurality of telephone lines,
a distributing frame affording an appearance thereon for each of said lines,
number identifying means individual to each said distributing frame appearance of said lines,
an intercept trunk multiple,
a plurality of signal-directing element means connected between predetermined ones of said distributing frame appearances of said lines and said intercept trunk multiple,
means for applying an identification signal to said intercept trunk multiple, and
means responsive to the establishment of a switching connection to one of said predetermined lines for rendering said signal-directing element means individual thereto conductive to couple said identification tone from said intercept trunk multiple to said number identifying means individual to said last-mentioned one of said lines.

2. In a telephone switching system having a plurality of lines, identifier means individual to each of said lines, a source of identifier operating signals and means for normally applying said identifier operating signals through the switching train to identify the directory number of a calling one of said lines, the combination comprising an intercept trunk multiple, a plurality of diode means each connecting a respective one of said lines to said intercept trunk multiple, means responsive to the establishment of a switching connection to a called one of said lines for applying said identifier operating signals to said intercept trunk multiple, and means including said switching train for rendering said diode means individual to said called one of said lines conductive to couple said identifier operating signals to said identifier means individual to said called one of said lines.

3. In a telephone switching system having a plurality of intercepted lines and including an intercept trunk, in combination, means responsive to any of said intercepted lines being called for applying an identifying tone signal to said intercept trunk, a plurality of similarly-poled diode devices connected to said trunk, each of said diode devices being also connected to a respective one of said intercepted lines, means including the switching train of said switching system for rendering conductive the diode device respective to a called one of said intercepted lines, said conductive diode device thereupon applying busy potential to said trunk, and identifying network means individual to each of said lines, said network means individual to said called one of said lines being operated by said tone signal to identify the directory number of said called line.

4. In a telephone switching system according to claim 3, the combination wherein said identifying network means each includes a capacitor connected to one of said diode devices and wherein said diode devices individual to the non-called ones of said lines each has a Zener threshold voltage greater than the sum of the peak value of said tone signal developed across said capacitor.

5. In a telephone switching system having a plurality of telephone terminals, directory number identifying means connected to said terminals, an intercept trunk, diode means individually connecting particular ones of said terminals to said trunk, a signal source for operating said identifying means, said signal source being connected to said intercept trunk and said diode means normally isolating said source from said plurality of telephone terminals, and means for establishing a switching connection to one of said particular ones of said terminals for rendering said diode means individual thereto conductive to said signal source.

6. In a telephone switching system a plurality of circuit paths each including a diode and a line identifier, the diodes of said paths being connected together at a common point, alternating current signal means connected to said point and normally isolated by each said diode from each said line identifier, and means including a switching train connector for applying an unblocking potential to said diode of the called one of said paths to couple said signal means to said line identifier thereof.

No references cited.

WILLIAM C. COOPER, *Primary Examiner.*

U.S. Cl. X.R.

179—27